United States Patent [19]

Menadier et al.

[11] Patent Number: 5,253,095
[45] Date of Patent: Oct. 12, 1993

[54] FULL DUPLEX COMMUNICATION SYSTEM AND METHOD OF USING SAME

[75] Inventors: Michael A. Menadier, Vista; Michael A. Williams, San Diego, both of Calif.

[73] Assignee: H. M. Electronics, Inc., San Diego, Calif.

[21] Appl. No.: 904,201

[22] Filed: Jun. 25, 1992

Related U.S. Application Data

[63] Continuation of Ser. No. 427,690, Oct. 27, 1989, abandoned, and a continuation-in-part of Ser. No. 427,650, Oct. 27, 1989, Pat. No. 5,027,433, and a continuation-in-part of Ser. No. 326,225, Mar. 20, 1989, abandoned, which is a continuation-in-part of Ser. No. 132,345, Dec. 14, 1987, Pat. No. 4,882,770.

[51] Int. Cl.$^5$ ............................................. H04B 10/02
[52] U.S. Cl. ..................................... 359/174; 359/152; 359/172; 359/176
[58] Field of Search ............... 359/145, 146, 152, 159, 359/174, 176, 172

[56] References Cited

U.S. PATENT DOCUMENTS

| | | | |
|---|---|---|---|
| 4,516,221 | 5/1985 | Nakata et al. | 359/174 |
| 4,648,131 | 3/1987 | Kawaguchi et al. | 359/172 |
| 4,680,811 | 7/1987 | Harper et al. | 359/152 |
| 4,727,600 | 2/1988 | Avakian | 359/172 |

FOREIGN PATENT DOCUMENTS 0202633  11/1983  Japan ................................. 359/152

Primary Examiner—Richard E. Chilcot, Jr.
Assistant Examiner—Kinfe-Michael Negash
Attorney, Agent, or Firm—Bernard L. Kleinke; Jerry R. Potts

[57] ABSTRACT

A stationary optical antenna forming a part of a full duplex optical communication system, includes optical emitter and receptor devices having peak power axes, and a mounting arrangement for positioning the devices at an elevated location within a room with their axes directed downwardly at a given angle to a horizontal plane, based upon the height of the devices above the floor, thereby enabling remote portable transceivers to be able to communicate therewith within the same room. Baffles help prevent interference between the emitters and receptors, and a compensation circuit is employed to enable the optical communication to take place, even in bright light conditions.

9 Claims, 6 Drawing Sheets

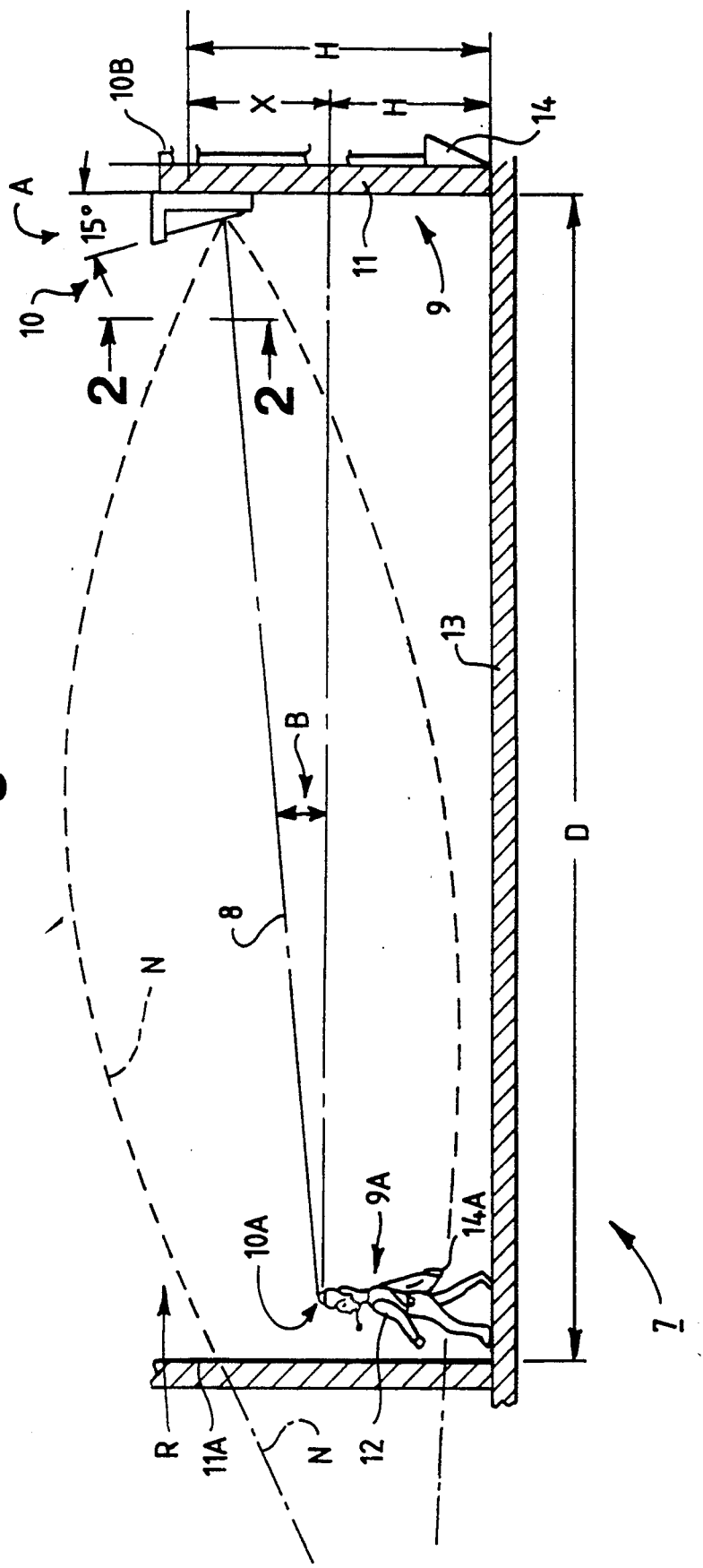

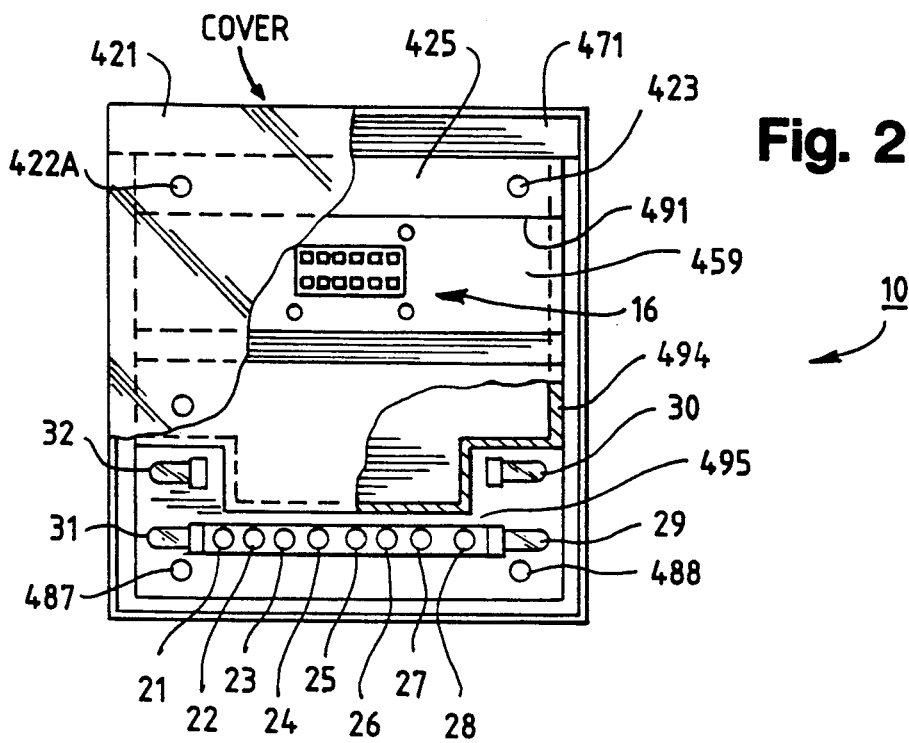
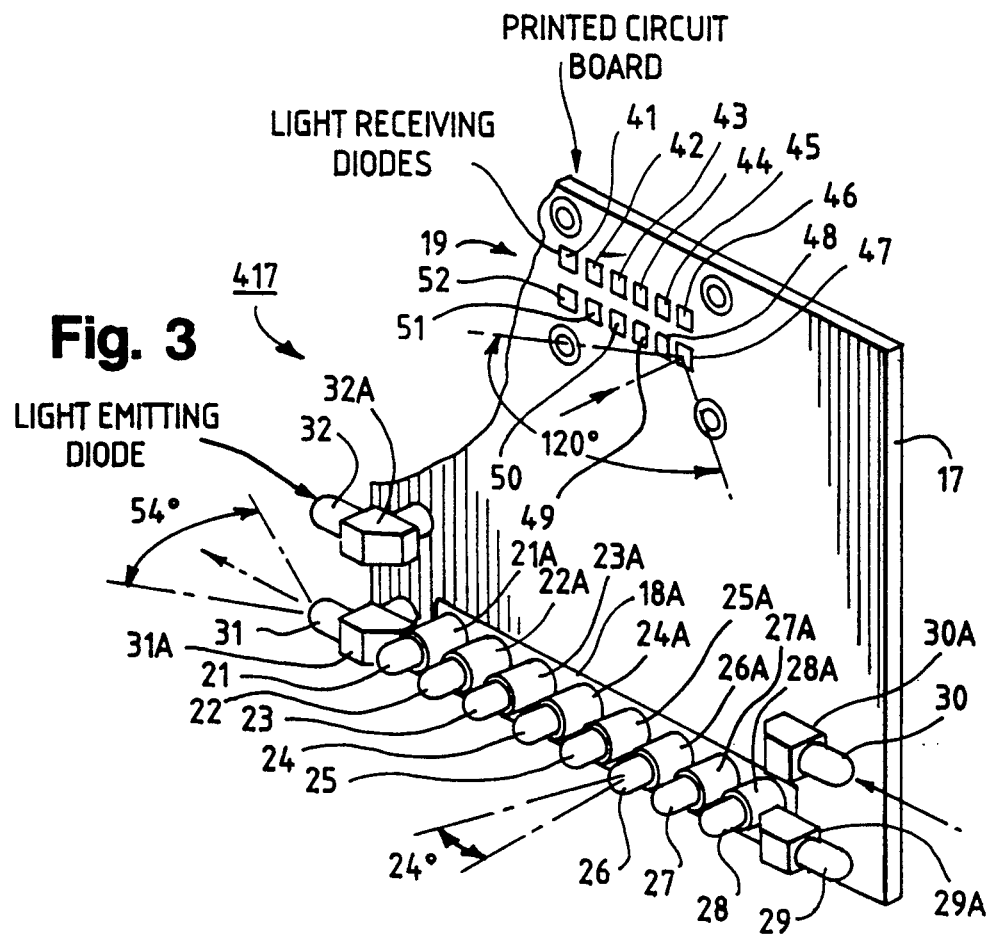

FULL DUPLEX COMMUNICATION SYSTEM AND METHOD OF USING SAME

CROSS REFERENCE TO RELATED APPLICATION

This is a continuation, of U.S. patent application Ser. No. 07/427,690, filed on Oct. 27, 1989.

This patent application is a continuation-in-part application of U.S. patent application No. 07/326,225 filed Mar. 20, 1989, now abandoned, entitled "OPTICAL WAVELENGTH COMMUNICATION SYSTEM AND METHOD OF USING SAME" which is a continuation-in-part of U.S. patent application Ser. No. 07/132,345 filed Dec. 14, 1987 now U.S. Pat. No. 4,882,770 issued Nov. 21, 1989 and continuation-in-part of U.S. patent application Sr. No. 07/427,650, filed Oct. 27, 1989, now U.S. Pat. No. 5,024,433 entitled "REMOTE INFRARED TRANSCEIVER AND METHOD OF USING SAME", now U.S. Pat. No. 5,027,433 issued Jun. 25, 1991 said applications and patents being assigned to the same assignee and being incorporated herein by reference.

TECHNICAL FIELD

The present invention is related in general to a full duplex communication system; and a method of using it, and the invention more particularly relates to a system in the form of an infrared communication system, which is adapted to be used in-doors in both large and small rooms of buildings used for a variety of purposes, such as restaurants, factories, offices and others.

BACKGROUND ART

Optical wavelength communication systems are highly desirable for use in many different applications. Such systems can be used to replace radio frequency systems, such as those used in fast food restaurants, since the optical wavelength carrier does not require special government licenses and are more tolerant of noise interference. For example, short range optical wavelength carrier communication systems are disclosed in the foregoing mentioned co-pending U.S. patent applications. In the co-pending applications, each optical wavelength communication system enables full duplex communication between two or more transceivers. In at least one of the systems disclosed in the foregoing mentioned co-pending applications, both remote and repeating base station transceivers communicate simultaneously with one another over optical wavelength carriers in a full duplex mode of operation. Since the transceivers employ light frequency carriers, both transceivers must be disposed in direct line of sight communication relative to one another. While such optical wavelength carrier systems may be highly usable for many applications, it would be highly desirable to have such an optical wavelength communication system, which enables at least some of the transceivers to be carried from place to place within the same room. For example, in a fast food restaurant, it is desirable to enable the employees to communicate with one another, as they walk between work stations, during the course of the day, while performing their duties.

In actual use, such an antenna and two-way communication system could be used to permit communication between various work stations and workers as they move about through the restaurant from one work station to another. Thus, such a communication system and antenna would not only be able to transmit and receive signals from a fixed work station, but should also be able to communicate with the workers at such work stations as they move from one station to another within the same large, open room. Such a room may be as long as 30 feet in length.

Due to the size of the room, in order to maintain line-of-sight optical communication, several stationary repeating base station transceivers are required to be spaced throughout the room, to insure continuous communication with a plurality of portable remote communication transceivers carried by employees Thus, it would be highly desirable to employ only a single base station having an antenna system, which can communicate with all portable remote transceivers being carried from place to place in the same large room. However, the cost of the additional stationary base stations is undesirable. Also, there is added expense in labor to install the additional units within the customer's place of business. Moreover, for any given location, it may be difficult, or even impossible, to install a multiplicity of base stations throughout the room, due to the positioning of other equipment within the room.

Several formidable problems have been encountered. For example, the light wave carrier signals generated from a single base station antenna must be capable of being received by the portable units disposed within a given geographical area, regardless of various fixtures and other obstructions which may be disposed within the transmission area. In this regard, since infrared systems are founded on a direct line of sight basis and have a transmission/reception lobe wherein such signals may be communicated, an obstruction disposed within the lobe between a transmitting antenna and a receiving antenna, the communications will necessarily be interrupted.

Therefore, it would be highly desirable to have a new and improved infrared full duplex, communication system and method of using only a single base station for a given large room, and yet the new and improved system would help to eliminate, or at least to greatly reduce, unwanted interrupted infrared communications, due to obstructions and the like.

Similarly, the base station transceiver must be capable of generating a sufficient amount of optical energy to permit the transceivers to be operated satisfactorily in day light, or in bright artificial light conditions. In this regard, in the normal working environment, workers must have adequate light to carry out the normal working tasks. However, strong or bright ambient light tends to interfere with photosensitive diodes so that receptive communication can be greatly hindered or impeded Therefore, it would be highly desirable to have an infrared system and method of using the same to facilitate transmitting and receiving infrared communication signals between portable infrared remote and base station transceiver, while being used in a brightly lighted area and from substantially any location within that given geographical area.

Another problem associated with a single base station transceiver has been signal interference developed between the infrared signals being transmitted by the base station antenna, and the reception of signals being transmitted by the portable remote transceivers. In this regard, it has been difficult, if not impossible to prevent the infrared carrier signals being transmitted by the base station transceiver from also being received by the base station without resorting to special fiberoptical communication paths, light shields or other similar devices to prevent such interference in communications.

Therefore, it would be highly desirable to have a new and improved infrared system and method of using the antenna, which would substantially eliminate the reception of infrared signals transmitted by the antenna itself. Such a system should be limited to a single stationary base station transmitter for a given room, to help reduce the overall cost of the system, as well as the initial installation expense for such a system.

DISCLOSURE OF INVENTION

Therefore, it is the principal object of the present invention to provide a new and improved infrared system full duplex communication and method of using it, to transmit and receive infrared optical wavelength carrier signals, while employing a minimum number of stationary transceivers within the same room, where one or more portable transceivers are being employed.

Another object of the present invention is to provide such a new and improved communication system and method of using it which substantially eliminates the reception of infrared interference signals transmitted by the antenna itself, and enables satisfactory optical communication throughout the room, even in the presence of bright ambient light conditions.

Briefly, the above and further objects of the present invention are realized by providing a new and improved full duplex infrared communication system and method of using it, to transmit and receive infrared optical wavelength carrier signals, between at least one portable infrared communication transceiver and a minimum number of stationary base station transceivers within the same large room. In this regard, the portable infrared communication system can be disposed within substantially any locale of a given geographical area, and can transmit and receive infrared signals from the stationary base station transceiver with little or no interference, in such communications due to obstructions and the like, and even in the presence of bright ambient light conditions.

A stationary optical antenna forming a part of a full duplex optical communication system, includes optical emitter and receptor devices having peak power axis, and a mounting arrangement for positioning the devices at an elevated location within a room with their axes directed downwardly at a given angle to a horizontal plane, based upon the height of the devices above the floor, thereby enabling remote portable transceivers to be able to communicate therewith within the same room. Baffles help prevent interference between the emitters and receptors, and a wavelength selection circuit is employed to enable the optical communication to take place, even in bright light conditions.

By directing the peak power axes downwardly at the given angle, portable remote optical transceivers can communicate substantially continuously with the stationary transceiver, and thus only one such antenna is required for a given sized room, such as one which is about 30 feet in length.

The antenna assembly of the transceiver includes a baffle arrangement, which eliminates substantially the reception of the infrared signals emanating from the antenna assembly itself, so that the antenna assembly is substantially only able to receive infrared signals generated by a remotely located portable infrared communication transceiver. The antenna assembly and the devices mounted thereon are so arranged and positioned to permit the antenna assembly to receive and transmit infrared signals from substantially any locale of a given geographical area.

The method of using a single base station infrared transceiver is achieved by mounting the antenna assembly on a stationary wall at a given height within a given room at or near the ceiling level so the primary power axis is slightly inclined at an angle from the horizontal In this manner, the emitter and receptor devices arranged on the antenna assembly are so disposed to permit a sufficient amount of optical energy to be disbursed for transmission purposes and received for reception purposes with reference to the portable transceivers so that communication is achieved from substantially any locale within a given geographical area or room.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein:

FIG. 1 is a partially diagrammatic, sectional elevational view of a full duplex infrared communication system, which is constructed according to the present invention, and which is not drawn to scale for illustration purposes, showing the system in operation within a room;

FIG. 2 is a greatly enlarged, partially cut away, front face view of the base station infrared antenna assembly of the system of FIG. 1;

FIG. 3 is a fragmentary, enlarged pictorial view of a printed circuit board of the base station infrared antenna assembly of FIG. 2;

BEST MODE FOR CARRYING OUT THE INVENTION

Figure 4:
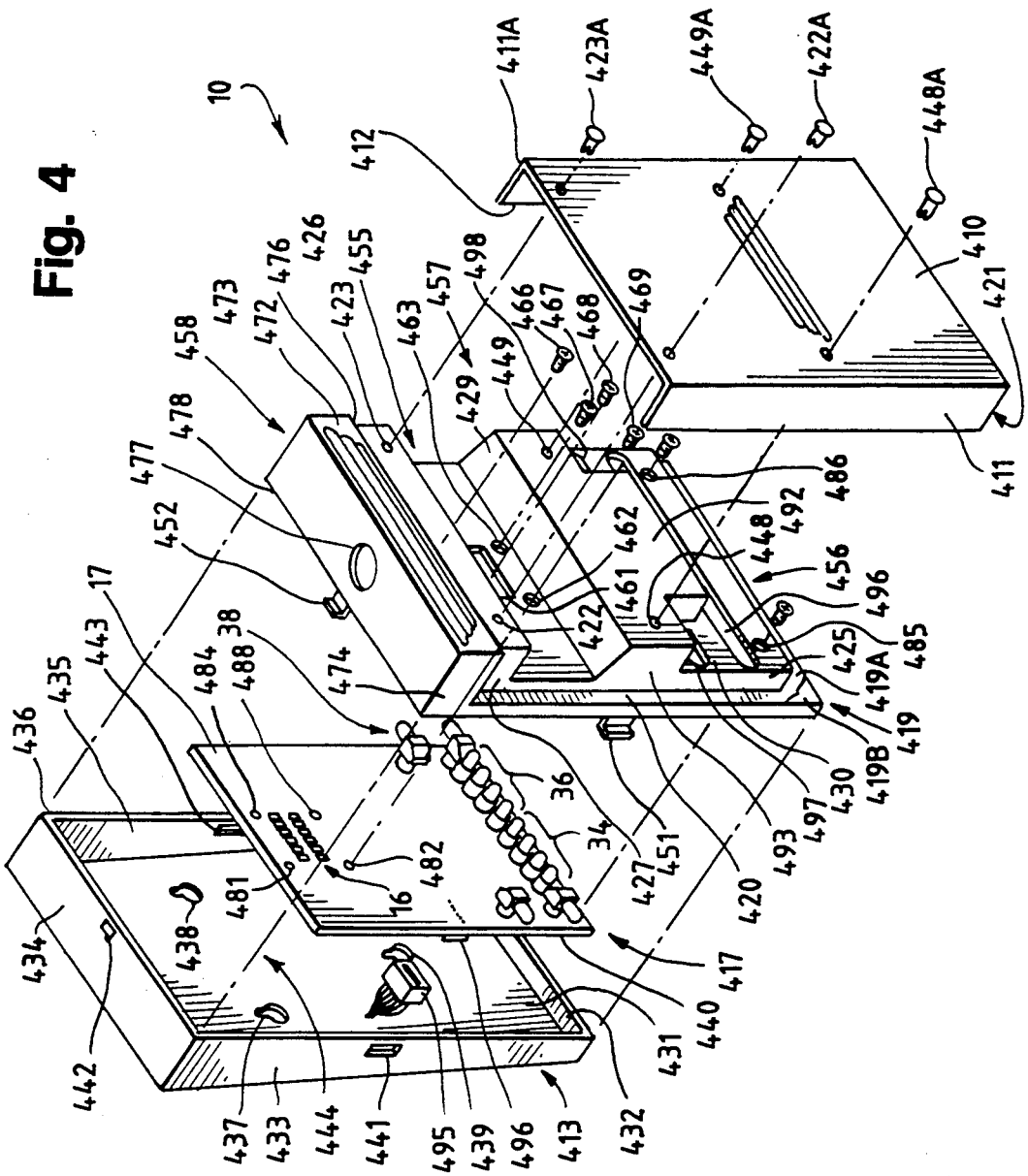
FIG. 4 is an exploded pictorial view of the base station infrared antenna assembly of FIG. 2.

Referring now to the drawings, and more particularly to FIG. 1 thereof, there is illustrated a full duplex infrared communication system 7, which is constructed in accordance with the present invention, and which is adapted to be used within a large, open room R.

The communication system 7 generally comprises a base station transceiver generally indicated at 9 for communicating with a group of portable remote transceivers, such as the transceiver 9A worn by the user 12, for infrared communication therebetween. The base station transceiver is a repeating transceiver to enable the user 12 to communicate by the remote transceiver 9A to other persons (not shown) wearing like remote transceivers (not shown).

The foregoing mentioned copending U.S. patent application Ser. Nos. 07/176,939 and 07/326,225 disclose, in greater detail, the operation of the infrared communication system. In co-pending U.S. patent application Ser. No. 07/427,650, filed Oct. 27, 1989, there is disclosed in greater detail the remote transceiver 9A.

The base station transceiver 9 generally comprises a base antenna assembly 10, which is mounted on a wall 11 at one end of the room R. A base transceiver unit 14 is mounted outside the room R and is connected by a cable 10B through an opening (not shown) in the wall 11 to the antenna assembly 10 to include the necessary electronic circuits as hereinafter described in greater detail.

The remote transceiver 9A generally includes a headset antenna assembly 10A, worn on the head of the user 12 for communicating with the base antenna assembly 10.

By wearing it on the head, the antenna assembly 10A is positioned above many different optical obstructions (not shown). However, it is to be understood that the remote transceiver antenna assemblies may be worn or carried by the user in different locations on the person of the user.

A remote transceiver unit 14A is also worn by the user 12 at the waist, and is electrically connected to the headset antenna assembly 10A. The remote transceiver unit 14A includes the electronic circuits of the remote transceiver as hereinafter described in greater detail.

In order to minimize the number of base station transceivers in a given installation, such as in the room R, in accordance with the present invention, the base station antenna assembly 10 is mounted on the wall 11 at a height H above the floor 13 by a sufficient distance, such as about seven and one half (7½) feet above the floor 13. The height H is arbitrarily chosen to be sufficiently high above the floor 13, to facilitate irradiating the room and is chosen low in height for most installations, since it, of course, must be installed below the ceiling (not shown) of the room R. The room R is quite long in length, and has a distance D along the floor 13 between the wall 11 and the opposite wall 11A. For example, assume that the distance D is 30 feet, which is a typical distance of an open room in a restaurant.

As hereinafter described in greater detail, the antenna assembly 10 has a peak intensity axis of infrared radiation directed downwardly from a horizontal plane at an angle of B from the horizontal. In order to achieve the proper and desired angle, the face of the antenna assembly 10 is inclined downwardly by an angle of A from the surface of the wall 11. In the present example, angle A is equal to 5 degrees.

The angle A is determined by the average user's height $H_T$. In the present example, the average user's height $H_T$ is equal to the number five and one half (5½) feet in height. In order to assure that the remote transceiver 9A is able to communicate optically in a substantially continuous and uninterrupted manner with the base station 10 as the user walks along the floor 13 of the room R, when the user 12 is positioned at the opposite wall 11A, the antenna assembly 10A when worn on the head of the user 12 will be approximately five and one half (5½) feet above the floor 13. In this position, the pea axis 8 is a substantially straight line extending between the base station antenna assembly 10 and the remote antenna assembly 10A. Assuming that the height H is given, to be seven and one half (7½) feet, the angle A equals approximately 3.8 to 5.0 degrees, where the length of the room D is equal to about 30 feet.

The transceiver 9A is able to communicate effectively with the repeating base station antenna assembly 10 with the foregoing dimensioned configuration, since the communication node N surrounding the central peak intensity axis 8 is directed downwardly toward the opposite wall 11A and intersects therewith at about the height $H_T$ above the floor D, thereby filling a substantial space of the room R. In this regard, as shown in FIG. 1, the node N does substantially fill the entire space of the room R, because for a typical base station antenna assembly 10, the effective length of the peak intensity axis 8 is forty (40) feet, and therefore it would extend beyond the opposite wall 11A, so that the envelope of the node N would extend as indicated by imaginary phantom lines extending in FIG. 1 beyond the wall 11A. It should be understood that the presence of the wall 11A precludes such an extension of the node N therebeyond, since the radiation is ordinarily reflected therefrom. It is also important to note that the node N of infrared energy emitted from the base station antenna assembly 10 is reflected within the room R, and reception by the remote transceiver 9A is possible beyond the space occupied by the node N. This is especially true in the space near and below the base station antenna assembly 10.

Thus, by mounting the novel base station antenna assembly 10 at the height H and inclined downwardly from the wall 11 at an angle A, only a single repeating base station transceiver is necessary for a relatively long room, such as the room R having a given length D, and assuming a given user's average height $H_T$. It should be noted that the height H for the base station antenna assembly 10 is equal to the user's average height $H_T$ plus a distance X. The distance X is equal to two (2) feet in the present example, and the distance H is less than the height of the average ceiling.

Referring now to FIGS. 1, 2, 4 and 5, the base station antenna assembly 10 generally comprises a base member 413 adapted to be secured removably to the surface of the wall 11 at the optimum operating height of approximately seven and one half feet from the floor 13. The antenna assembly 10 also includes a housing or baffle unit 419 which is adapted to be secured removably within the base member 413. An antenna unit 417 is adapted to be secured to the baffle unit 419 and includes a receptor network 16 and an emitter network 18 which are connected electrically to the base transceiver unit 14 via cable 10B. The baffle unit 419 is so constructed as will be explained hereinafter in greater detail to help prevent the infrared carrier signals being transmitted to the remote transceiver 9A from being received by the receptor network 16 of the antenna unit 417. In order to protect the antenna unit 417 from airborne contaminates, such as dust and grease, the antenna assembly 10 also includes a transparent cover 421. The cover 421 is removably mounted on top of the housing unit 417 and also serves as a filter to help reduce ambient light interference.

In operation, the base unit antenna assembly 10 performs two functions: it transmits infrared lightwave modulated signals on a single wavelength carrier to remotely located infrared transceiver units and it receives infrared lightwave modulated signals on a single wavelength carrier from the remotely located infrared transceiver antenna assembly 10 receives infrared signals from the remotely located infrared transceiver units and converts these signals to electrical signals for use by the infrared communication system 20, or conversely, it receives electrical signals from the infrared communication system 20 and converts these signals into infrared lightwave modulated signals on a single wavelength carrier for transmission to the remotely located infrared communication systems, such as system 9A.

Considering now the base member 413 in greater detail with reference to FIGS. 1-4, it generally has a unitary construction and is composed of a suitable plastic material. The base member 413 is cup shaped, and is generally rectangular in plan view. It includes a flat base plate 431 that is integrally connected to a set of mutually perpendicular sidewalls 432-435 that extend outwardly therefrom The upper periphery of the side walls 432-435 terminate in a lip or rim 436 which defines an opening 444 to the base member 413.

As further illustrated in FIG. 4, the base plate 431 is adapted with a plurality of circular openings indicated at 437, 438 and 439 each of which includes a narrow slit-like portion which is dimensioned to snugly receive the shank portion of a wall mounting screw (not shown). In this regard, three wall mounting screws may be threadably secured into the wall surface 11 in a spaced apart pattern that conforms to the openings 437-439 in the base plate 431. Base member 413 may then be secured removably to the wall 415 by inserting the head and shank portions of the screws through openings 437-439 and then permitting the shank portion of tho screws to be slidably received within the narrow slit like portion of each opening.

As further illustrated in FIG. 4, the upper portion of each of the sidewalls 432-435 of base member 413 include a single slit-like opening generally indicated at 440, 441, 442 and 443, respectively. The slit-like openings 440-443 are adapted to receive a set of L-shaped upstanding cantilevered finger members, such as 451 and 452, that are integrally connected to the housing unit 419. In this regard, when the housing unit 419 is inserted into opening 444 of the base member 413, the finger members of the housing unit 419 matingly engage the openings 440-443 in the base member 413. As the finger members matingly engage the base member 413 they flex outwardly to secure removably the housing unit 419 to he base member 413.

As best seen in FIG. 4, sidewalls 433 and 435 extend perpendicularly outwardly from the base plate 431 but do not terminate at equal distances from base plate 431. In this regard sidewall 434 extends outwardly from the base plate 431 to a much greater distance than sidewall 432. As a result of these differences when housing unit 419 is mounted to base member 413 its lower portion nearest to the floor 13 will be inclined away from the surface of wall 11 at approximately a 5 degree angle. By inclining the housing unit 419 downwardly from the horizontal, the reception and transmission of the infrared lightwave modulated signals being emitted and received by the antenna unit 417 is greatly facilitated.

It should be understood that the housing unit 419 can be inclined as much as ninety degrees from the surface of the wall 11 with excellent transmission and reception of infrared signals in a very small area of the room R directly beneath the antenna assembly 10. In the preferred embodiment of the present invention, the angle at which the housing unit 419 is inclined away from the surface of the wall 11 may vary in a range between two degrees to eight degrees. A more preferred range is three to six degrees, and the most preferred angle is five degrees.

Considering now the antenna unit 417 in greater detail with reference to FIGS. 3 and 4, the antenna unit 417 generally comprises a printed circuit board 17 which is generally rectangular in shape and is adapted to be secured removably to the baffle unit 419 as will be described hereinafter in greater detail. The printed circuit board 17 supports a photosensitive diode array 19 and a set of infrared emitter diode arrays 34, 36 and 38 that permit the antenna unit 417 to receive and transmit short range optical energy signals. The antenna unit 417 also includes a male connector 496 which is mounted to the printed circuit board 17 which is adapted to matingly engage a female connector 495. Connectors 495 and 496 permit the signals transmitted and received by the antenna unit 417 to be coupled to the base transceiver unit 14.

Considering now the printed circuit board 17 in greater detail with reference to FIGS. 3 and 4, the printed circuit board 17 is generally rectangular in shape and has a series of holes or openings that are disposed adjacent its lower peripheral edge. The openings or holes are designed to receive the leads of a set of narrow angle infrared emitter diodes 21-28. The leads of each respective infrared emitter diode 21-28 is soldered to the printed circuit board 17.

Printed circuit board 17 further includes a set of holes or openings that are disposed on each of its lateral peripheral edges. These opening or holes are designed to receive the leads of a set of wide angle infrared emitter diodes 29-32. The leads of each respective wide angle infrared emitter diode 29-32 is also soldered to the printed circuit board 17. It should be noted that each infrared emitter diode includes a standoff or holder, such as holders 21A-32A which helps space apart each respective infrared emitter diode. In order to help facilitate the radiating of optical energy by the infrared emitter diodes 21-32 the baffle unit 419 has a reflective coating over the entire front surface thereof, and is secured thereto, by any suitable means, such as by a chrome plating 419A on the substrate 419B. When emitter diodes 21-28 are mounted to the printed circuit board 17 they radiate light along a peak power axis that is substantially perpendicular to the face of the printed circuit board 17. In a like manner when emitter diodes 29-32 are mounted to the printed circuit board 17 they permit the light emitting diodes 29-32 to radiate light along a peak power axis that is substantially parallel to the face of the printed circuit board 17. In this manner, and because of the various reflective surfaces of the housing unit 419 due to the chrome plating, the optical energy radiated by diode 21-32 covers substantially one-hundred and eighty degrees of dispersion relative to the face or surface of the antenna assembly 10.

Considering now the housing or baffle unit 419 in greater detail with reference to FIGS. 1-4 it generally has a unitary construction is composed of a suitable plastic material that is metalized to be highly reflective. The housing unit 419 includes a pair of spaced apart channel portions 455 and 456 that are separated by a baffle portion 457. Channel portions 455 and 456 are integrally connected to baffle portion 457 along one of their peripheral edges. The housing unit 419 is generally rectangular in plan view and is dimensioned to be received within opening 444 of the base member 413. The housing unit 419 further includes a baffle member 458 which is integrally connected to channel 455 along one of its peripheral edges.

Considering now channel portion 455 in greater detail with reference to FIGS. 2 and 4, it is integrally formed between baffles 457 and 458 and includes a flat base plate 459. Base plate 459 is integrally connected to a front wall portion 429 of baffle 457 that extends perpendicularly upward therefrom and a back wall 491 of baffle 458 that extends upwardly therefrom at a slightly inclined angle. Base plate 459 includes a cut out portion defining an opening 461 which permits the photodiode array 19 mounted to printed circuit board 17 to extend therethrough and into channel 455. Opening 461 is generally rectangularly shaped. A set of spaced apart countersunk holes, such as 462 and 463, are disposed adjacent to the opening 461 and are adapted to receive a set of screws 466-469 for securing removably the printed circuit board 17 to the housing unit 419. Screws 466-469 extend through the openings in channel 455 and are received within a corresponding set of holes 481-484 disposed in the printed circuit board 17. A set of hexnuts (not shown) are threadably received on screws 466-469 for removably securing the printed circuit board 17 to the baffle unit 419.

Considering now baffle 458 in greater detail with reference to FIG. 4, it has a unitary construction, and is also composed of a plastic material that is metalized to be highly reflective The baffle 458 generally includes a lower portion 425 and a raised portion 471.

The raised portion 471 is generally rectangularly shaped having a top portion 472, a back wall portion 473, a pair of side wall portions, such as side wall 474, and a front wall portion 476. An opening 477 is disposed in the geometric center of back wall 473 and is adapted to receive the cable 10B. A rubber grommet (not shown) is disposed within the opening 477 to support and receive cable 10B. The conductor leads of cable 10B extend to and terminate at connector 495 in order to couple the signals transmitted and received by the antenna unit 417 to the transceiver unit 14.

As best seen in FIG. 4, the back wall portion of baffle 458 terminates in a lip 478. One of the L-shaped upstanding cantilevered finger members, member 452, extends perpendicularly outwardly from the geometric center of lip 478 and adjacent to the opening 477.

Also as best seen in FIG. 4, the front wall portion 476 extends perpendicularly downwardly from top 472 and terminates in a base plate 420 that is an integral part of the housing unit 419.

Considering now the lower portion 425 in greater detail with reference to FIGS. 2, and 4, it has a unitary construction and is composed of a plastic material, such as an electronic plastic material. The lower portion 425 is proportionally smaller than the raised portion 471 and extends outwardly from the front wall 476 of raised portion 471. The lower portion 425 includes a top 426, a pair of side walls, such as side wall 427, and a front wall portion 429. The top and side walls of the lower portion 425 are integrally connected along a portion of their periphery to the front wall 476 of the raised portion 471. The side walls of the lower portion 425 also extend perpendicularly downward from top 426 and terminate in the base plate 420. The top 426 includes a pair of spaced apart holes 422 and 423. Holes 422 and 423 are disposed adjacent side walls 427 and 428, respectively. The holes are dimensioned to receive a pair of fasteners 422A and 423A that help secure the cover 421 to the housing unit 419.

Considering now channel portion 456 in greater detail with reference to FIGS. 2 and 4, it is generally rectangular shaped in plan view and has a unitary structure. The channel 456 includes a base plate 430 having an elongated slot-like cut out portion 496 and a pair of spaced apart slot-like cut out portions 497 and 498. Cut out portions 496, 497 and 498 permit the infrared emitter diode arrays 34, 36 and 38 mounted to printed circuit board 17 to extend therethrough and into channel 456. A set of spaced-apart counter sunk holes 485 and 486 are disposed adjacent each terminal end of cut out portion 496 and are adapted to receive a set of threaded screws 487 and 488 for securing removably, the printed circuit board 17 to the housing unit 419. Screws 487 and 488 extend through the holes 485 and 486 respectively and are secured by a set of nuts (not shown) to removably secure printed circuit boards 17 to the housing unit 419.

Considering now the baffle 457 in greater detail with reference to FIGS. 2 and 4, it is generally T-shaped, and has a unitary structure. The baffle 457 includes its back wall portion 429, a top portion 492, a pair of side wall portions 493 and 494 and a front wall portion 495. The side wall portions 493 and 494 extend perpendicularly downwardly from the top portion 492 and terminate in the base plate 420. The front wall portion 495 extends perpendicularly downwardly from the top portion 492 and terminates in base plate 430.

The top portion 492 of the baffle is generally T-shaped having a pair of holes 448 and 449 disposed thereon. The holes, 448 and 449, are dimensioned to receive a pair of fasteners 448A and 449A that help secure the cover 421 to the housing unit 419

Considering now the cover 421 in greater detail with reference to FIGS. 2 and 3, it has a unitary construction and is composed of a suitable transparent material to infrared radiation which therefore permits the passage of infrared optical signals without distortion. The cover includes a base plate 410 that is generally rectangular in shape. A side wall 411 that includes a rim wall portion 411A extends upwardly from the base plate 410 and terminates in a lip 412. The height of the side wall 411 is dimensioned to permit the lip portion 412 of the cover 421 to rest against the base plate 430 of the housing unit 419 and to permit the inner surface of the base plate 410 to rest against top surfaces 426 and 492. The length of the cover is dimensioned to permit the cover 421 to completely overlay the lower portion 425 of baffle 457, channel 455, baffle 458 and channel 456.

Figure 5:
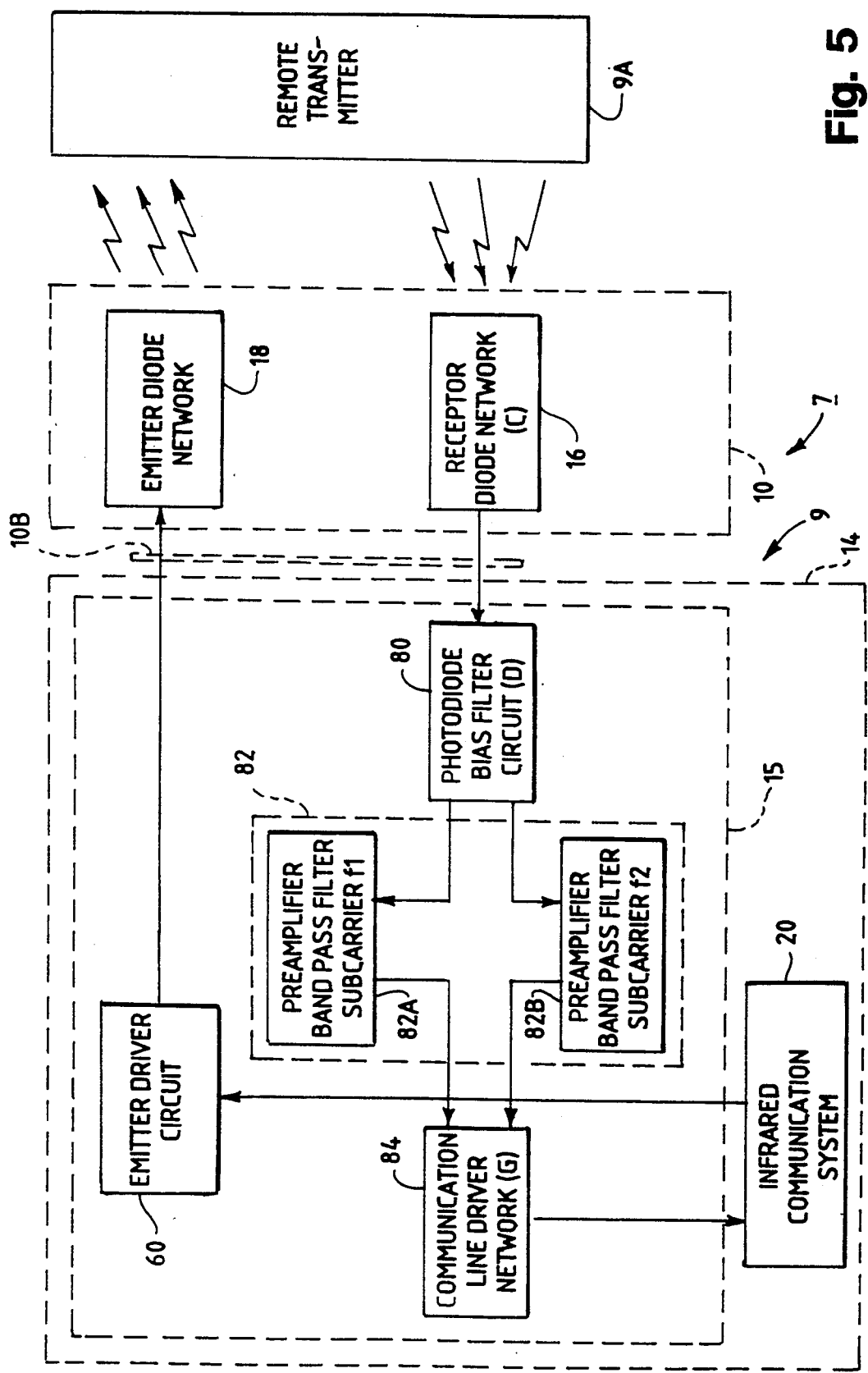
FIG. 5 is a block diagram of the full duplex system of FIG. 1.
Figure 6A:
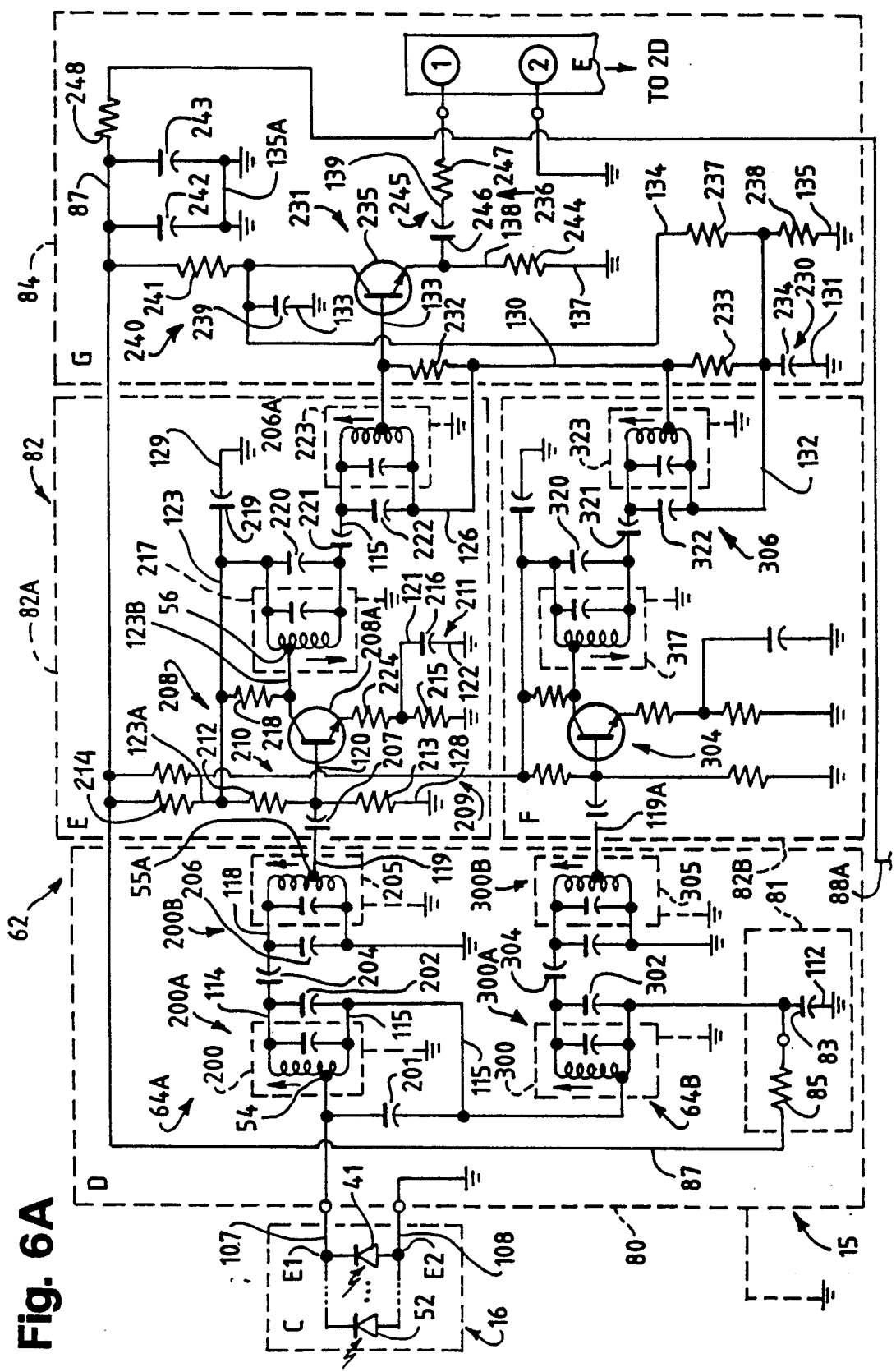
FIGS. 6a and 6b when arranged one about the other is a schematic circuit diagram of the station transceiver.
Figure 6B:
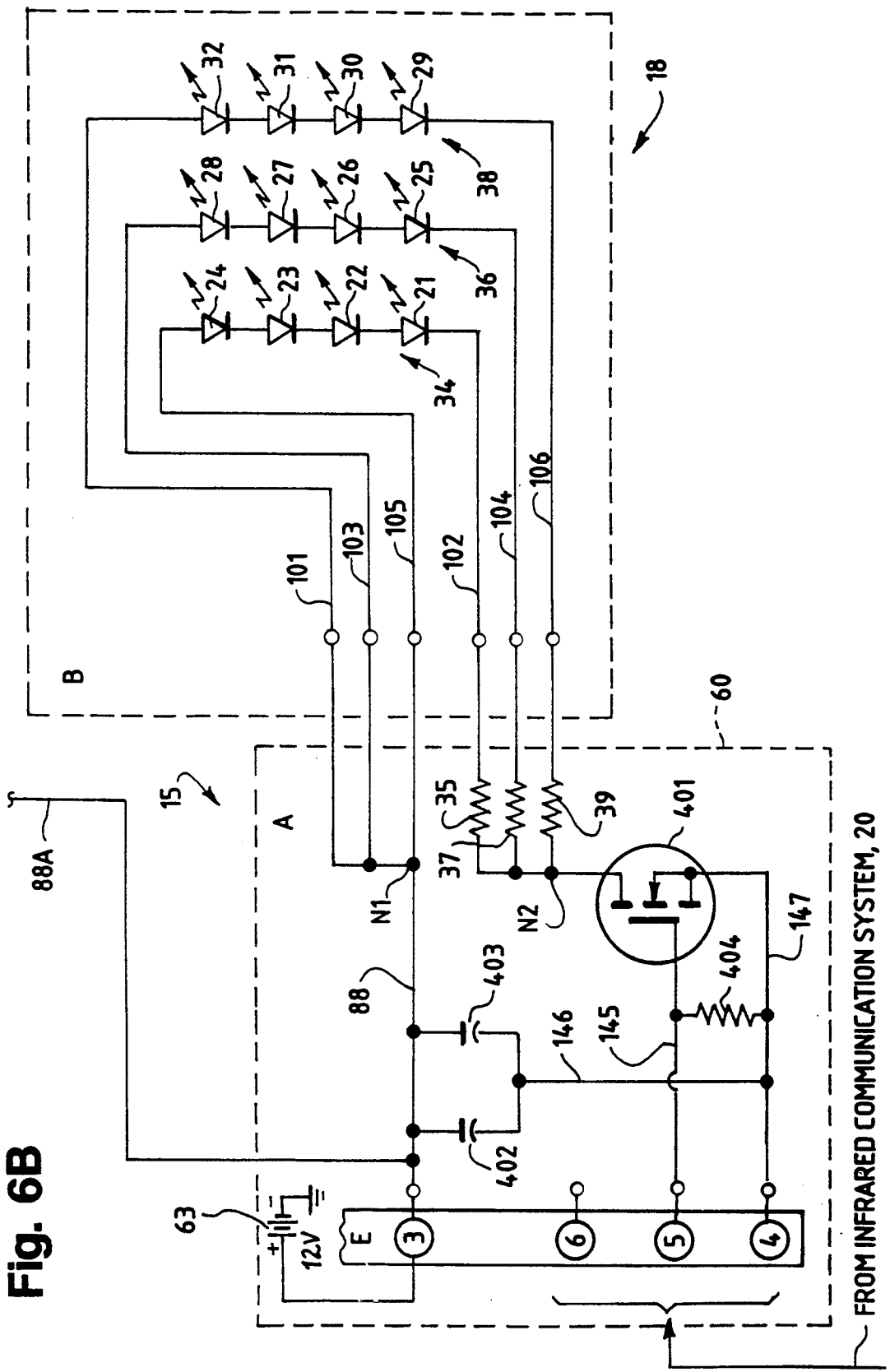

Considering now the base transceiver unit 14 in greater detail with reference to FIG. 5, 6a and 6b, the base transceiver unit 14 generally comprises an infrared conversion module or network 15 and an infrared communication system 20. The infrared communication system 20 is more fully described in copending U.S patent application Ser. Nos. 07/132,345 and 07/326,225. The infrared conversion module 15 is coupled electrically to the receptor and emitter networks 16 and 18 of tho antenna unit 417 via cable 10B. The infrared conversion module 15 converts the signals received from the infrared communication system 20 into signals of an appropriate voltage level to drive the light emitting diode 21-32 on and off. Module 15 also demodulates the signals received from the photosensitive diodes 41-52 into an appropriate subcarrier frequency signal for coupling to the infrared communication system 20.

Considering now the receptor network 16 in greater detail with reference to FIGS. 3, 4 and 6a, the receptor network 16 generally comprises a set of twelve infrared sensitive photodiodes 41-52 which are connected in parallel between a pair of nodes E1 and E2 disposed on printed circuit board 17. Photodiodes 41-52 are connected to the infrared conversion network 15 which demodulates the lightwave carrier signal into an electrical subcarrier frequency signal as will be described hereinafter in greater detail Photodiodes 41-52 are connected in parallel as each diode serves as an independent current source for supplying electrical current to the infrared conversion network 15. Photodiodes 41-52 are biased by a direct current voltage source which is coupled through a photodiode bias-filter circuit 80 to decouple the photodiodes 41-52 from the direct current voltage supply. In this regard, the photodiode bias-filter circuit 80 ensures that low-level modulated infrared light from a remote infrared communication system, such as system 12, can be received by the diodes 41-52 even in the presence of a substantially bright ambient light which is not modulated at the subcarrier frequency generated by system 12. In the preferred form of the present invention, diodes 41-52 each have an angle of reception of approximately one hundred and twenty degrees and are manufactured by Siemens under part number BPW34.

Considering now the emitter network 18 in greater detail with reference to FIGS. 3, 5, 6a and 6b, the emitter network 18 generally comprises a set of light emitting diodes 21-32. Diodes 21-32 are connected to the conversion network 15 which causes the electrical subcarrier frequency signal generated by the infrared communication system 20 to be converted into an electrical signal of sufficient voltage to turn the diodes 21-32 on and off at a given frequency rate to modulate the subcarrier frequency signal on their radiated infrared light.

Considering now the infrared emitter diodes 21-32 in greater detail with reference to FIGS. 3 and 6b, emitter diodes 21-32 are arranged in a set of three diode strings 34, 36 and 38 that are connected in parallel between a light emitting diode driver circuit 40. The light emitting diode driver circuit 40 forms part of the infrared conversion network 15 and will be described hereinafter in greater detail. Diode strings 34 and 36 are narrow angle emitter diode strings and include two sets of four emitter diodes each, with each respective set being connected in series. In this regard, diode string 34 includes emitter diodes 21, 22, 23 and 24 while diode string 36 includes emitter diodes 25, 26, 27 and 28. Diode string 34 is coupled to the infrared conversion network 15 by a pair of conductors 101 and 102 while diode string 36 is coupled to the infrared conversion network 15 by a pair of other conductors 103 and 104. In the preferred embodiment of the present invention emitter diodes 21-28 are manufactured under part number TSHA 5203 and have a half power radiant cone of approximately twenty-four degrees. Diode string 38 includes a set of four wide angle light emitting diodes 29, 30, 31 and 32. Diodes 29-32 are connected in series and are coupled to the infrared conversion network 15 by a pair of conductors 105 and 106. In the preferred embodiment of the present invention diodes 29-32 are manufactured under part number OP293A and have a half power radiant cone of approximately fifty-four degrees.

In operation, the light radiated by the infrared communication system 12 is impinged upon the infrared photosensitive diodes 41-52 which generate an electrical signal. In this regard, each photodiode generates a certain amount of electrical current which is proportional to the amount of light falling on the diode. The current from the twelve photodiodes 41-52 is summed as a result of the photodiodes 41-52 being connected in parallel by a set of conductors 107 and 108. The photodiode bias-filter circuit 80 provides a direct current bias for the photodiodes 41-52 as well be explained in further detail hereinafter.

Considering now the infrared conversion network 15 in greater detail with reference to FIGS. 6a and 6b, the infrared conversion network 15 is connected between the emitter and receptor networks 16 and 18, and the infrared communication system 20 and generally comprises an emitter driver 60 that includes a direct current voltage source 63, and an infrared demodulator circuit 62. The emitter driver 60 receives the modulated subcarrier electrical signals generated by the infrared communication system 20 on a set of terminals E4, E5 and E6 via a shielded cable 10A. Emitter driver 60 converts the modulated subcarrier into electrical signals of an appropriate voltage level to drive the emitter network 18. Conversely, the infrared demodulator circuit 62, receives the electrical signals generated by the receptor network 16 and demodulates the signals into an electrical subcarried frequency signal for coupling to the infrared communication system 20 via a set of terminals E1 and E2 connected to the shielded cable 10A.

Considering now the infrared demodulator circuit 62 in greater detail with reference to FIG. 6a the demodulator circuit 62 generally comprises the photodiode bias-filter circuit 80, a receptor preamplifier arrangement 82, and line driver network 84 for coupling the received signal to the infrared communication system 20. The receptor preamplifier arrangement 82 responds to the signals passed by the bias-filter circuit 80 and rejects all subcarrier frequency signals that are not generated by the remote transmitter 9A.

Considering now the photodiode bias filter circuit 80 in greater detail with reference to FIG. 6a, the photodiode bias filter circuit 80 generally comprises a bias network 81 and a filter network 64. The bias network 81 provides a direct current bias voltage to the photodiodes 41-52 while filter network 64 in cooperation with the receptor preamplifier arrangement 82 rejects all frequency signals that are not substantially at or near the subcarrier frequency generated by the transceiver 14.

Considering now the bias network 81 in greater detail with reference to FIG. 6a, the bias network 81 generally includes a bypass capacitor 83 and resistor 85. Register 85 is connected between the direct current voltage source 63 via conductor 87 and the receptor network 16 via the filter network 64 by a pair of conductors 107 and 111. In the preferred embodiment of the present invention resistor 85 is a 100 ohm, ¼ watt resistor while capacitor 83 is a polarized one microfarad, 25 volt capacitor having its negative terminal connected to ground via a conductor 112.

Considering now the filter network 64 in greater detail with reference to FIGS. 5 and 6, the filter network 64 generally comprises a pair of filter circuits 64A and 64B which are tuned to two different subcarrier frequency signals f1 and f2 respectively that are transmitted by the transceiver unit 14. Filter circuits 64A and 64B are substantially identical except for tuning value components as will be explained hereinafter in greater detail. As circuits 64A and 64B are substantially identical only circuit 64A will be described hereinafter in greater detail.

Considering now filter network 64A in greater detail with reference to FIGS. 5 and 6a, filter network 64A generally comprises a pair of cross matched tank circuits 200A and 200B which are coupled together via a coupling capacitor 204. Filter network 64A is connected to the preamplifier arrangement 82 by conductor 119 as will be explained hereinafter in greater detail. It should be noted that filter network 64B contains a similar pair of cross matched tank circuits 300A and 300B which are coupled together via a coupling capacitor 304. Filter network 64B is connected to the preamplifier arrangement 82 by a conductor 119A.

Considering now the tank circuit 200A is greater detailed with reference to FIG. 6a, tank circuit 200A generally comprises a transformer winding 200, a coupling capacitor 201 and a tuning capacitor 202. Tank circuit 200A presents a substantially high impedance load to the photodiodes 41–52 at or near its resonant frequency f1 and a relatively low impedance at all other frequencies; thus, rejecting or preventing the passing of the other frequency signals to the preamplifier arrangement 82. The electrical signals generated by diodes 41–52 are coupled to a tap input terminal 54 of winding 200 via the conductor 107. To tune the tank circuit 200A to a resonant frequency at or near subcarrier frequency f1, tho tuning capacitor 202 is connected across the transformer winding 200 via a pair of conductors 114 and 115. Conductor 114 is also connected to the coupling capacitor 204 which is connected to the mutually coupled tank circuit 200B via a conductor 118. Conductor 115 is connected to capacitor 201 to provide a feedback path to terminal 54 of winding 200 via conductor 107. In the preferred embodiment of the present invention capacitor 201 is a 0.0022 microfarad capacitor while capacitor 202 is a 220 picofarad capacitor.

Considering now the tank circuit 200B in greater detail with reference to FIG. 6a, the tank circuit 200B generally comprises a transformer winding 205 and a tuning capacitor 206. Winding 205 includes an output tap 55 which is connected to the preamplifier arrangement 82 via the conductor 119. Tank circuit 200B is coupled between tank circuit 200A and the preamplifier arrangement 82 by the coupling capacitor 207. To tune the tank circuit 200B to a resonant frequency at or near the subcarrier frequency f1 the tuning capacitor 206 is connected across the transformer winding 205 via a pair of conductors 118 and 118A. Conductor 118 is connected between capacitors 204 and 206 while conductor 118A is connected between the other lead at capacitor 206 and ground. In the preferred embodiment of the present invention capacitor 206 is a 220 picofarad capacitor.

Considering now the preamplifier arrangement 82 in greater detail with reference to FIGS. 5 and 6a, the preamplifier arrangement 82 generally comprises a pair of preamplifier bandpass circuits 82A and 82B which are connected to filter networks 64A and 64B via conductors 119 and 119A respectively. The preamplifier bandpass circuits 82A and 82B are substantially identical except for tuning value components as will be explained hereinafter in greater detail. As circuits 82A and 82B are substantially identical only preamplifier bandpass circuit 82A will be described hereinafter in greater detail.

Considering now preamplifier bandpass circuit 82A in greater detail with reference to FIGS. 5 and 6a, the preamplifier bandpass circuit 82A generally comprises a direct current blocking capacitor 207 to couple circuit 82A to the filter circuit 64A, a common emitter amplifier circuit 208 for amplifying the subcarrier frequency signal f1 received from the transceiver 14, and a coupling arrangement 206A for coupling the amplifier circuit 208 to the line driver network 84. In this regard, the coupling arrangement 206A, permits the amplifier subcarrier frequency signal (f1) to be passed to the line driver network 84 for coupling the subcarrier frequency signal to the antenna assembly 10.

Considering now the direct current blocking capacitor 207 in greater detail with reference to FIG. 6a, the blocking capacitor 207 is connected between the output of the filter circuit 64A via conductor 119 and the input to the common emitter amplifier circuit 208 via a conductor 120. The blocking capacitor 207 blocks any extraneous direct current signals from the common emitter amplifier circuit 208. In the preferred embodiment of the present invention, capacitor 207 is a polarized one microfarad capacitor having its negative terminal coupled to the output tap 55A of the transformer winding 205 via conductor 119.

Considering now the common emitter amplifier circuit 208 in greater detail with reference to FIG. 6a, the common emitter amplifier circuit 208 includes a transistor 208A, and a bias arrangement 209. The base of transistor 208A is coupled to the positive terminal of capacitor 207 via a conductor 120. Transistor 208A is an NPN transistor configured as a common-emitter amplifier. In this regard, the bias arrangement 209 includes a base bias circuit 210 and an emitter bias circuit 211. The base bias circuit 210 comprises a pair of resistors 212 and 213 that are connected to the base of transistor 208A by the conductor 120. Resistors 212 and 213 function as a voltage divider to provide the proper bias voltage for the base of transistor 208A. Resistor 212 is connected to the direct current voltage source 63 via a resistor 214 that is connected to resistor 212 via a conductor 123A.

Considering now the emitter-bias circuit 211 in greater detail with reference to FIG. 6a, the emitter bias circuit 211 consists of a resistor 224 that limits and stabilizes the gain of the emitter amplifier 204. Resistor 224 is connected in series via a conductor 121 with a resistor 215 and a capacitor 216. Resistor 215 establishes the direct current emitter current while capacitor 216 functions as an a.c. bypass for resistor 215. Resistor 215 and capacitor 216 are connected in a parallel arrangement between resistor 214 and ground. In the preferred embodiment at the present invention, resistor 224 is a 10 ohm, ¼ watt resistor; resistor 215 is a 100 ohm, ¼ watt resistor having one lead connected to ground by a conductor 128; and capacitor 216 is a 1 microfarad, 25 volt polarized capacitor with its negative terminal connected to ground via a conductor 122.

To limit the signal amplified by the common emitter amplifier 208 to the subcarrier frequency f1, the common emitter amplifier 208 is coupled from the collector of transistor 208A to an input tap 56 of a transformer inductor winding 217 via a conductor 123B. A resistor 218 provides a terminating impedance for the transformer winding 217 and is connected between the collector of transistor 208A and the input tap 56 of inductor winding 217. The other lead of resistor 218 is connected between resistors 212 and 214 and a bypass capacitor 219 via a conductor 123. In this regard, the resistor 214 supplies the operating current to amplifier 208 and decouples the amplifier 208 from the direct current voltage source 63. A tuning capacitor 220 is connected in parallel with winding 217 to assure that the desired subcarrier frequency (f1) is passed to the coupling arrangement 206. In the preferred embodiment of the present invention resistor 218 is a 1.8 kohm, ¼ watt resistor: and capacitor 219 is a one microfarad 25 volt polarized capacitor with its negative lead connected to ground via a conductor 124; and capacitor 221 is a 220 picofarad capacitor.

Considering now the coupling arrangement 206A in greater detail with reference to FIG. 6a, the coupling arrangement 206A generally comprises a direct current blocking capacitor 221, a tuning capacitor 222, and a transformer winding 223. The coupling arrangement 206A further filters the amplified signal from amplifier circuit 208 to the subcarrier frequency f1. In this regard, the tuning capacitor 222 in cooperation with the transformer winding 223 permits only subcarrier signals having an f1 frequency to be passed to the line driver network 84. In the preferred embodiment of the present invention capacitor 222 is a 220 picofarad capacitor that is connected in parallel with the transformer winding 223 by a pair of conductors 125 and 126.

Considering now the preamplifier circuit 82B in greater detail with reference to FIG. 6a, the preamplifier circuit 82B is substantially identical to the preamplifier circuit 82A except that is amplify and passes the subcarrier frequency signal f2 to the line driver circuit 84. In this regard, the preamplifier circuit 82B generally comprises a common emitter amplifier 308 and a coupling arrangement 306A to permit the amplified subcarrier frequency signal f2 to be passed to the line driver circuit 84.

As already noted, circuit 64A is substantially identical to circuit 64B with the exception of certain component values. In this regard, Table I provides the different component values between the above-mentioned circuits:

TABLE I

| TANK CIRCUIT 200A | | TANK CIRCUIT 300A | |
|---|---|---|---|
| Capacitor 202 | 220 pf | Capacitors 302 | 180 pf |
| Transformer 200 | 308.594 kHz | Transformer 300 | 335.937 kHz |
| TANK CIRCUIT 200B | | TANK CIRCUIT 300B | |
| Capacitor 206 | 220 pf | Capacitor 306 | 180 pf |
| Transformer 205 | 308.594 kHz | Transformer 305 | 335.937 kHz |
| Capacitor 204 | 33 pf | Capacitor 305 | 22 pf |
| PREAMPLIFIER 208 | | PREAMPLIFIER 308 | |
| Capacitor 220 | 220 pf | Capacitor 320 | 180 pf |
| Transformer 217 | 308.594 kHz | Transformer 317 | 335.937 kHz |
| COUPLING ARRANGEMENT 206A | | COUPLING ARRANGEMENT 306A | |
| Capacitor 222 | 220 pf | Capacitor 322 | 180 pf |
| Transformer 223 | 308.594 kHz | Transformer 323 | 335.937 kHz |
| Capacitor 221 | 33 pf | Capacitor 321 | 22 pf | from preamplifier circuits 82A and 82B to be combined in series and applied to the base of an emitter follower buffer circuit 231 which isolates the preamplifier circuits 82A and 82B from the infrared communication system 20. The buffer circuit 231 also provides a low source impedance to drive the infrared communication system 20.

Considering now the terminating network 230 in greater detail with reference to FIG. 6a, the terminating network consists of a pair of series connected resistors 232 and 233. Resistor 233 is coupled to ground via capacitor 234. Resistor 232 provides a terminating impedance for the coupling arrangement 206A while resistor 233 provides a terminating impedance for the coupling arrangement 306A. Capacitor 234 is an a.c. bypass for resistor 238. In the preferred embodiment of the present invention resistors 232 and 233 are both 1.8 kohm ¼ watt resistors, that are connected in by a 130. Capacitor 234 is a polarized one microfarad 25 volt capacitor that has its negative terminal to ground via a conductor 131. The positive terminal of capacitor 234 is connected to resistor 233 and capacitor 322 by a conductor 132.

Considering now the buffer circuit 231 in greater detail with reference to FIG. 6a, the buffer circuit 231 comprises a transistor 235 whose output is coupled to the infrared communication system 20 via a network 236. The output signal of the buffer circuit 231 is an electrical signal which is indicative of the modulated subcarrier frequency signals generated by the remote transceiver 9A. The base of transistor 235 is connected to the output of tho coupling arrangement 206A by conductor 133. The base bias for transistor 235 is provided by a pair of resistors 237 and 238 through the respective coupling arrangements 206A and 306A. A capacitor 239 connected between ground via a conductor 133 and resistor 237 via a conductor 134 provides an a.c. bypass for the bias arrangement. Resistor 238 is connected between ground via a conductor 135 and resistor 237 and the positive lead of capacitor 234. The collector of transistor 235 is also connected to the decoupling network 240 which supplies current to transistor 235 and decouples the transistor 235 from the direct current voltage source 63.

Considering now the decoupling network 240 in greater detail with reference to FIG. 6a, the decoupling network 240 comprises a resistor 241 which is connected to 63 via a resistor 248. A pair of a.c. bypass capacitors 242 and 243 are connected between ground via a conductor 135A and resistors 241 and 248 via a conductor 87.

Considering now the coupling network 236 in greater detail with reference to FIG. 6a, the coupling network provides a terminating impedance for a 50 ohm coaxial cable 10B which connects the output of the antenna assembly 10 to the base station transceiver 14. In this regard the coupling network 236 generally comprises an emitter resistor 244 which provides a direct current path from the emitter of transistor 235 to ground via a conductor 137 and a termination circuit 245 that provides the terminating impedance for the coaxial cable 10B. In the preferred embodiment of the present invention, the emitter resistor 244 is a 1.0 kohm, ¼ watt resistor.

Considering now the terminating circuit 245 in greater detail with reference to FIG. 6a, the terminating circuit 245 generally comprises a direct current blocking capacitor 246 and terminating resistor 247. In the preferred embodiment of the present invention capacitor 246 is a 0.1 microfarad 100 volt capacitor connected between the emitter resistor 244 (via conductor 138) and the terminating resistor 247. (via conductor 139). Resistor 247 is connected by one lead to capacitor 246 via the conductor 139 and the infrared communication system 20 via a conductor 141. Resistor 247 is a 47 ohm ¼ watt resistor.

Considering now the emitter driver 60 in greater detail with reference to FIG. 6b, the emitter driver 60 is coupled to the infrared communication system 20 via the shielded cable 10B. In this regard, the infrared communication system 20 provides a subcarrier frequency signal to the emitter driver 60 to modulate the subcarrier frequency signal on the light radiated by the emitter diodes 21-32. The subcarrier frequency signal from the infrared communication system 20 is a square wave signal having a subcarrier frequency of either f1 or f2. The square wave signal alternates between approximately zero and eleven volts and is coupled to the transistor 401. A pair of bypass capacitors 402 and 403 are connected between the source of transistor 401 Via conductor 146 and the direct current voltage source 63, via conductor 88 which is also connected to the anodes of diodes 24, 28 and 32. Transistor 401 in the preferred embodiment of the present invention, is an enhancement mode, n-channel power field effect transistor which functions as a switch to drive the light emitting diodes 21-32 on and off. In this regard, when the subcarrier frequency signal is at approximately zero volts the drain-source resistance of transistor 401 is very high, thus, turning off the light emitting diodes 21-32.

Conversely, when the signal is at approximately eleven volts, the drain-source resistance of transistor 401 is very low; i.e. substantially less than one ohm; thus, turning the diodes 21-32 on. A resistor 404 connected between the gate of transistor 401 via conductor 145 and capacitors 402 and 403 via conductor 146 maintain input voltage to transistor 401 at approximately zero volts when the input cable 10B is disconnected from the conversion circuit 15. The output signal from transistor 401 is coupled to each of the diode strings 34, 36 and 38 via the current limiting resistors 35, 37, and 39 respectively In the preferred embodiment of the present invention the bypass capacitor 402 is a 0.1 microfarad, 100 volt capacitor while capacitor 403 is a 10 microfarad, 16 volt polarized capacitor.

While particular embodiments of the present invention have been disclosed, it is to be understood that various different modifications are possible and are contemplated within the true spirit and scope of the appended claims There is no intention, therefore, of limitations to the exact abstract or disclosure herein presented.

What is claimed is:

1. An optical communication system for facilitating full duplex communication between remote transceivers comprising:
   a base station transceiver for receiving optical communications from one of the remote transceivers and for repeating the optical communications to at least another one of the remote transceivers;
   said base station transceiver having an antenna assembly and a stationary transceiver unit connected electrically to said antenna assembly; and
   means for mounting said antenna assembly at a height H above a floor at one end of a room and inclined from the vertical by an angle A to enable the base station transceiver unit to direct a peak power axis of optical radiation downwardly at an angle B form the horizontal toward a wall at the opposite end of said room, said axis intersecting said wall at a distance D from said base station transceiver unit, and at a height $H_T$ above the floor, the height $H_T$ being equal to the height of the remote transceiver within the same room.

2. An optical communication system according to claim 1, wherein said stationary transceiver unit transmits an infrared radiation beam.

3. An optical communication system according to claim 1 wherein said antenna assembly includes:
   optical emitter devices and optical receptor devices; and
   baffle means optically separating said emitter and receptor devices to inhibit the emitter devices from causing unwanted optical interference with said receptor devices.

4. An optical communication system according to claim 1, wherein said transceiver unit includes compensating circuit means to enable said stationary transceiver to discriminate the incoming optical messages from ambient light.

5. An optical communication system according to claim 1, wherein said optical radiation directed from said antenna assembly is modulated infrared radiation.

6. An optical communication system according to claim 1 wherein the angle A is between two degrees and eight degrees.

7. An optical communication system according to claim 6 wherein a more preferred range is between three degrees and six degrees.

8. An optical communication system according to claim 7 wherein the most preferred angle at which the housing unit is inclined away from the wall is five degrees.

9. A method of communicating optically comprising:
   using a base station having a transceiver and an antenna assembly for receiving optical communications and for directing the received optical communications to at least one remote optical transceiver within the same room;
   mounting said base station antenna assembly at a height H above the floor of the room and inclined downwardly away from the vertical by an angle A to direct an optical radiation node having a peak power axis of optical radiation inclined downwardly at an angle B from the horizontal toward an opposite end of said room to cause said radiation axis to intersect a wall disposed at a distance D from said base station transceiver, and at a height $H_T$ above the floor, the height $H_T$ being equal to the height the remote transceiver is disposed within the same room.

* * * * *

UNITED STATES PATENT AND TRADEMARK OFFICE
CERTIFICATE OF CORRECTION

PATENT NO. : 5,253,095

DATED : October 12, 1993

INVENTOR(S) : Michael A. Menadier, Michael A. Williams

It is certified that error appears in the above-identified patent and that said Letters Patent is hereby corrected as shown below:

Column 17, line 53, delete "form" and substitute therefor --from--.

Signed and Sealed this

Nineteenth Day of April, 1994

Attest:

BRUCE LEHMAN

*Attesting Officer*      *Commissioner of Patents and Trademarks*